United States Patent [19]

Wienecke

[11] Patent Number: 5,073,389

[45] Date of Patent: Dec. 17, 1991

[54] MINERAL SUPPLEMENTED CANDY PRODUCT CONTAINING MULTIPLE DISCRETE REGIONS

[75] Inventor: Horst P. Wienecke, Gross-Gerau, Fed. Rep. of Germany

[73] Assignee: The Procter & Gamble Company, Cincinnati, Ohio

[21] Appl. No.: 643,979

[22] Filed: Jan. 22, 1991

[30] Foreign Application Priority Data

Jan. 24, 1990 [GB] United Kingdom ............... 9001621

[51] Int. Cl.⁵ .................... A23G 3/00; A23L 1/304
[52] U.S. Cl. ...................... 426/103; 426/74; 426/660
[58] Field of Search ............... 426/74, 660, 103, 274, 426/284, 295

[56] References Cited

U.S. PATENT DOCUMENTS

| | | | |
|---|---|---|---|
| 4,062,986 | 12/1977 | Billerbeck | 426/74 |
| 4,153,732 | 5/1979 | Muhler | 426/74 |
| 4,279,932 | 7/1981 | Koshida | 426/103 |
| 4,287,216 | 9/1981 | Mangano | 426/103 |
| 4,335,147 | 6/1982 | Sollich | 426/295 |
| 4,450,179 | 5/1984 | Vink | 426/103 |
| 4,517,205 | 5/1985 | Aldrich | 426/103 |
| 4,582,709 | 4/1986 | Peters | 426/660 |
| 4,614,658 | 9/1986 | Wilson | 426/103 |
| 4,623,543 | 11/1986 | Motegi | 426/103 |
| 4,684,528 | 8/1987 | Godfrey | 426/74 |
| 4,753,790 | 6/1988 | Silva | 426/103 |
| 4,758,439 | 7/1988 | Godfrey | 426/74 |
| 4,847,090 | 7/1989 | Della Posta | 426/103 |
| 4,911,937 | 3/1990 | Crosello | 426/103 |
| 5,002,791 | 3/1991 | Knebl | 426/284 |

FOREIGN PATENT DOCUMENTS 0075443  3/1988  European Pat. Off. ............ 426/660

OTHER PUBLICATIONS

American Heritage Dictionary 1982, Houghton Mifflin Company, pp. 772 to 773.

*Primary Examiner*—Carolyn Paden
*Attorney, Agent, or Firm*—Douglas C. Mohl; Jack D. Schaeffer; Richard C. Witte

[57] ABSTRACT

A mineral supplemented candy product having improved mineral bioavailability properties and which comprises a matrix of sugar-free confectionary ingredients having distributed therein multiple discrete regions of a mineral supplement composition together with multiple discrete regions of a hardboiled candy composition incorporating an edible potentiating agent.

12 Claims, No Drawings

MINERAL SUPPLEMENTED CANDY PRODUCT CONTAINING MULTIPLE DISCRETE REGIONS

TECHNICAL FIELD

This invention relates to a confectionery product. In particular, it relates to a sugar-free or sugar-based mineral-supplemented candy product having improved mineral bioavailability, storage and flavor characteristics. In addition, the invention relates to a mineral-supplemented candy product which can be conveniently prepared by extrusion.

BACKGROUND OF THE INVENTION

Vitamin and mineral supplements for human and veterinary use are commonplace. Recently, it has become recognized that certain groups of the human population may require quite high intakes of minerals, such as calcium, to prevent or alleviate certain disease states, for example, osteoporotic conditions. The medical management of certain anemias can be handled rather well by increasing the daily intake of iron. Some diets, or heavy physical exercise, may require the intake of considerable quantities of minerals apart from those generally obtained through what otherwise would be considered a balanced diet.

Mineral supplements, such as those commercially available, are useful in many circumstances where enhanced mineral uptake is desirable. During the period of late teenage to young adulthood, it has been found that a signficant reduction in dietary calcium intake typically occurs. This is especially true of the female population and may be one reason for the susceptibility of females to osteoporosis in their later lives. The primary sources of calcium are milk and other types of dairy product. Many young people find milk unattractive to drink and to achieve a greater consumption of calcium, more appealing alternatives may sometimes be required.

Candy products are consumed in great quantities by the whole population but especially by teenagers and young adults. Accordingly, candy products which are nutritionally supplemented with minerals could be viewed as potential vehicles for achieving greater dietary intake of calcium and other minerals.

The use of mineral supplements in candy products is well known (eg. U.S. Pat. No. 4582709). Mineral-supplemented candy products often have a poor flavor impression, however, as they provide a slower or more lingering onset of sourness than is usually desirable in a fruit flavoured candy. It is also known that certain materials can act as "potentiators" which enhance the bioavailability of calcium in mineral supplements (see for example EP-A-0297681). Fructose is one such potentiator and the carbohydrates such as sucrose function similarly, albeit less well than fructose. Certain edible acids such as citric acid and malic acid are also known to act as potentiators, apparently by formation of highly soluble calcium citrate and malate species such as CaH (citrate), Ca(H$_2$ citrate)$_2$ and CaH (malate). Soluble species of this kind are relatively unstable however and are subject to disproportionation to the corresponding acid and more thermodynamically stable but less soluble salts such as Ca$_3$ citrate$_2$.

It would be desirable, therefore, to provide candy compositions incorporating mineral supplements and potentiators therefore and which display improved mineral uptake and bioavailability characteristics even after prolonged storage. It would also be desirable to provide candy compositions incorporating mineral supplements having improved flavor impact.

SUMMARY OF THE INVENTION

Accordingly, the present invention provide a mineral supplemented candy product having improved flavor and mineral bioavailability properties and which comprises a matrix of confectionery ingredients having distributed therein multiple discrete regions of a mineral supplement composition together with multiple discrete regions of a hardboiled candy composition and wherein the candy composition incorporates a potentiating agent selected from the edible acids and water-soluble salts and mixtures thereof.

In preferred embodiments, the matrix has a laminate structure comprising multiple alternate layers of the mineral supplement composition and of the hardboiled candy composition. Preferably, the matrix is additionally enveloped within a coating of a second hardboiled candy composition, the first and second hardboiled candy compositions being either the same or different to one another.

The present invention also provides a process for making the mineral supplemented candy product comprising the steps of forming a rope of the first hardboiled candy composition and having a centre-filling of the mineral supplement composition, the temperature of the rope being no more than about 65° C. in case of sugar-free compositions and no more than about 90° C. in case of sugar-based compositions, accumulating the rope and drawing the accumulated rope through compacting means to form a skein of centre-filled ropes, folding or repeatedly folding the skein of centre-filled ropes to form a laminated matrix, optionally enveloping the laminated matrix within a layer of the second hardboiled candy composition, and forming the laminated and optionally enveloped matrix into the final candy product.

The mineral supplement composition preferably comprises either a source of calcium and/or a source of iron, calcium sources being highly preferred The mineral sources are preferably present in nutritionally-supplemental amounts, which means that the mineral sources used in the practice of this invention provide a nourishing amount of said minerals. Preferably, this supplemental amount comprises at least 3% of the Recommended Daily Allowance (RDA) of the daily intake of said mineral, as defined in The United States of America (see Recommended Daily Dietary Allowance-Food and Nutrition Board, National Academy of Sciences-National Research Council). More generally, mineral supplements will contain at least 10%, more typically 50% to 300%, of the RDA per unit dose of the supplement. In candy products of the type disclosed herein, the nutritionally supplemental amount will generally comprise more than 3% of the RDA, preferably 10-100% RDA, most preferably 10-30% of the RDA, per unit portion of the candy product.

In general, the RDA (calcium) will range from 360mg per 6 Kg for infants to 1200 mg/54-58 Kg female, depending somewhat on age. The RDA (iron) ranges from 10mg per 6 Kg to 18 mg per 54-58 Kg female, depending somewhat on age.

The calcium source used in the practice of this invention can be any of the well-known calcium supplements, including calcium carbonate, calcium oxide, calcium hydroxide, calcium phosphate and the like. Calcium carbonate is highly preferred however.

The iron sources used in the practice of this invention can be any of the well-known iron supplements, including ferric chloride, ferrous sulfate, ferrous gluconate, ferrous lactate, ferrous tartrate, and the like. Ferrous sulfate and iron (II) sugar complexes are preferred however. In general terms, the mineral source will comprise from about 3% to about 50%, preferably from about 5% to about 15% by weight of the mineral supplement composition and from about 1% to about 15%, preferably from about 2% to about 5% of the candy product.

The mineral supplement composition can be complemented by various optional ingredients including one or more vitamins, provitamins, plasticizers, fillers, flavoring agents, coloring agents and/or sweetening agents and the like.

Suitable vitamins for inclusion herein include A,D-,E,C (ascorbic acid), $B_1$ (thiamin), $B_2$ (riboflavin $B_6$, $B_{12}$, nicotinamide, calcium D-pantothenate, niacin, folic acid and d-biotin. Other minerals besides calcium and iron include zinc, potassium, magnesium, manganese and copper.

A variety of traditional ingredients used as plasticizers, softeners or emulsifiers such as lanolin, lecithin, glyceryl monostearate, stearic acid, sodium stearate, potassium stearate, glyceryl triacetate, triacetin, glycerine and the like as well as natural waxes and fats (eg. peanut fat), petroleum waxes, paraffin waxes and microcrystalline waxes, can also be incorporated into the mineral supplement composition to obtain a variety of desirable textures and consistency properties. These additional materials are generally employed in amounts of up to about 50% by weight, preferably about 5% to about 30% by weight of the final mineral supplement composition.

The mineral supplement composition can additionally include conventional coloring agents and fillers. The mineral supplement composition can also include flavoring, coloring and/or sweetening agents (artificial, sugar and sugar alcohol types) as more fully described below in relation to the hardboiled candy composition. A preferred sweetening agent is powdered sugar.

The first and second hardboiled candy compositions, which may be the same or different but which are preferably the same, typically comprise one or more sugar alcohols and can be supplemented by conventional candy ingredients such as one or more flavoring agents, coloring agents and/or artificial sweetening agents. The sugar-free compositions are substantially free of saccharose components such as sucrose, fructose etc. while the sugar-based compositions contain a natural sugar such as sucrose, glucose, fructose, high fructose corn syrup, invert sugar and the like. Suitable sugar alcohols herein include sorbitol, mannitol, xylitol, maltitol and hydrogenated starch and glucose syrups produced by catalytic hydrogenation of carbohydrate syrups to the point where all carbohydrate end groups are reduced to alcohols. A suitable hydrogenated starch hydrolysate includes from about 5% to 10% sorbitol, from about 25% to about 75% maltitol and from 20% to about 40% hydrogenated higher saccharides. Typical hydrogenated starch hydrolysate are Lycasin (RTM) or Maltidex (RTM)100. The hardboiled candy composition can contain up to about 95% natural sugar and/or sugar alcohol, especially maltitol, sorbitol, mixtures of sorbitol and maltitol, mannitol or other sugar alcohols in a weight ratio of from about 9.5:0.5 to 7.5:2.5. Natural sugars and sugar alcohols can also be included in the mineral supplement composition in levels up to about 75%, preferably from about 10% to 50% by weight thereof. In this case, the preferred sugar alcohol is xylitol and the preferred sugar is powdered (icing) sugar.

Coloring, flavoring and/or artificial sweetening agents can also be included as part of the first and/or second hardboiled candy compositions.

Flavoring agents well known in the candy art can be added to the candy compositions of the invention. These flavoring agents can be chosen from synthetic flavor oils and/or oils derived from plants, leaves, flowers, fruits and so forth, and combinations thereof. Representative flavor oils include: spearmint oil, cinnamon oil, oil of wintergreen (methylsalicylate), eucalyptus and peppermint oils. Also useful are artificial, natural or synthetic fruit flavors such as citrus oil including lemon, orange, grape, lime and grapefruit, and fruit essences including apple, strawberry, cherry, blackcurrent, pineapple and so forth. The flavors may be supplemented by menthol where appropriate.

The amount of flavoring agents and/or flavor enhancers employed is normally a matter of preference subject to such factors as flavor type, base type and strength desired. In general, amounts of about 0.05% to about 3.0% by weight of the final composition are useable with amounts of about 0.3% to about 1.5% being preferred and about 0.7% to about 1.2% being more preferred.

Similarly, artificial sweeteners well-known in the art can be added to the compositions of the invention. Suitable artificial sweeteners encompass water-soluble sweeteners such as the soluble saccharin salts, i.e., sodium or calcium saccharin salts, cyclamate salts, such as the sodium salt and the like, and the free acid form of saccharin; dipeptide based sweeteners such as L-aspartyl-L-phenylalanine methyl ester and materials described in U.S. Pat. No. 3,392,131; dihydrochalcone; glycyrrhizin; *Stevia rebaudiana* (Stevioside); and the synthetic sweetener 3,6-dihydro-6-methyl-1,1,2,3-oxa-thiazin-4-one-2,2-dioxide, particularly the potassium (Acesulfame-K), sodium and calcium salts thereof as described in DE-A-2,001,017.

Artificial sweeteners are generally used in amounts of from about 0.005% to about 5% and most preferably from about 0.05% to about 1% by weight of the final composition.

In preferred embodiments, the candy product of the invention comprises the mineral supplement composition and the first hardboiled candy composition in a weight ratio of from about 5:1 to about 1:5, preferably from about 2:1 to about 1:2. Preferably, the candy product comprises from about 5% to about 40% by weight of the mineral supplement composition, from about 12% to about 60% of the first hardboiled candy composition and from about 5% to about 40% of the second hardboiled candy composition.

The potentiating agent suitable for inclusion in the first or second hardboiled candy composition is selected from the edible acids and water-soluble salts and mixtures thereof. Preferably, the potentiating agent is selected from citric acid, malic acid, tartaric acid and water-soluble salts and mixtures thereof.

Other edible acids such as lactic acid, gluconic acid, fumaric acid, adipic acid, phosphoric acid, ascorbic acid and their water-soluble salts and mixtures are suitable herein although less preferred.

The potentiating agent herein should be present in a potentiating amount, by which is meant an amount sufficient to enhance uptake and bioavailability of the mineral when administered to humans or lower animals. Typically, the edible acid potentiators are used in a weight ratio with the minerals (calculated as elemental minerals per se, discounting associated ions or ligands) of potentiator:mineral ranging from 1000:1 to 1:3, generally 3:1 to 1:1.

The compositions herein are preferably prepared by an extrusion-type lamination process using a machine as generally described in U.S. Pat. No. 4,648,316, Ruffinatti. A preferred process for making the candy product comprises forming a rope of the first hardboiled candy composition and having a centre-filling of the mineral supplement composition, the temperature of the rope being no more than about 65° C. in case of sugar-free compositions and no more than about 90° C. in case of sugar-based compositions, accumulating the rope and drawing the accumulated rope through compacting means to form a skein of centre-filled ropes, folding or repeatedly folding the skein of centre-filled ropes to form a laminated matrix, optionally enveloping the laminated matrix within a layer of the second hardboiled candy composition, and forming the laminated and optionally enveloped matrix into the final candy product.

The texture of the final candy product can be controlled at the laminate matrix forming stage by repeatedly folding the skein of centre-filled ropes to either a greater or lesser extent as appropriate.

The invention is illustrated by the following non-limiting examples:

EXAMPLE 1

A mineral supplement composition is prepared having the following formulation:

|  | Parts by Weight |
| --- | --- |
| Peanut fat | 100 |
| Calcium carbonate | 40 |
| Xylitol powder | 246 |
| Ascorbic Acid | 9.97 |
| Vitamin mixture* | 0.03 |
| Flavor | 4 |

*A mixture of Vitamins E, B1, B2, B6, B12, folic acid, d-biotin, nicotinamide, and calcium-D-pantothenate. The mineral supplement composition is prepared by warming the peanut fat to about 65° C. in a kneader, adding the calcium carbonate, ascorbic acid, vitamins and powdered sugar prewarmed to about 65° C., to the kneader, and mixing until a homogeneous mass is achieved.

A hardboiled sugar-free candy composition is then prepared by boiling maltitol syrup (about 75% total solids) at a temperature of about 165° C. to achieve a water content below about 1% by weight. The syrup is then cooled to a temperature of about 105-110° C., and dye, a fruit flavouring composition and citric acid are added thereto at levels respectively of about 0.5%, 0.8% and 1.3% by weight of the candy composition.

The mineral supplement composition (400 g) and a proportion (800 g) of the sugar-free candy composition are then laminated according to the process described above at a rope temperature of about 60° C., the skein of ropes being repeatedly folded at the laminate matrix forming stage, and the laminated sheet being enveloped within a 2-3 mm layer formed by the remainder (400 g) of the hardboiled sugar-free candy composition. Finally, the laminated matrix is passed to a sizing unit where the laminated matrix is formed into a rope and the rope is formed into individual candy units having an individual weight of about 4.2 g.

EXAMPLE 2

A mineral supplement composition is prepared having the following formulation:

|  | Parts by Weight |
| --- | --- |
| Peanut fat | 100 |
| Sugar, powdered | 246 |
| Calcium carbonate | 40 |
| Ascorbic acid | 9.97 |
| Vitamin mixture | 0.03 |
| Flavor | 4 |

The vitamin mixture is that of Example 1.

The mineral supplement composition is prepared by warming the peanut fat to about 85° C. in a kneader, adding the calcium carbonate, ascorbic acid, vitamins and powdered sugar prewarmed to about 85° C. and mixing until a homogenous mass is achieved.

A hardboiled candy composition is then prepared by boiling sugar and glucose syrup in a ratio 60:40 on wet base at a temperature of about 140°-150° C. After passing a vacuum, the candy composition is then cooled to about 118° C. and dye, a fruit flavouring composition and citric acid are added thereto at levels respectively of about 0.5%, 0.8% and 1.3% by weight of the candy composition.

The mineral supplement composition (400g) and a proportion (800g) of the candy composition are then laminated according to the process described above at a rope temperature of about 85° C., the skein of ropes being repeatedly folded at the laminate matrix forming stage, and the laminated sheet being enveloped within a 2-3mm layer formed by the remainder (400g) of the hardboiled candy composition. Finally, the laminated matrix is passed to a sizing unit where the laminated matrix is formed into a rope and the rope is formed into individual candy units having an individual weight of about 4.2g.

The candy products of Examples 1 and 2 display enhanced mineral bioavailability, storage and flavor characteristics.

What is claimed is:

1. A mineral supplemented candy product having improved mineral bioavailability properties and which comprises a matrix of confectionery ingredients having distributed therein multiple discrete regions of a mineral supplement composition together with multiple discrete regions of a hardboiled candy composition and wherein the candy composition incorporates a potentiating agent selected from the group consisting of edible acids and water-soluble salts and mixtures thereof.

2. A product according to claim 1 wherein the matrix has a laminate structure comprising multiple alternate layers of the mineral supplement composition and of the hardboiled candy composition.

3. A product according to claim 2 wherein the matrix is additionally enveloped within a coating of a second hardboiled candy composition, said first and second hardboiled candy compositions being either the same or different to one another.

4. A product according to claim 3 wherein the first and second hardboiled candy compositions comprises a natural sugar selected from the group consisting of sucrose, glucose, fructose, high fructose corn syrup, invert sugar and mixtures thereof.

5. A product according to claim 3 which is sugar-free and wherein the first and second hard boiled candy compositions comprises an agent selected from the group consisting of sugar alcohols, flavoring agents, coloring agents, artificial sweetening agents and mixtures thereof.

6. A product according to claim 1 wherein the mineral supplement is selected from the group consisting of calcium sources, iron sources and mixtures thereof.

7. A product according to claim 6 wherein the calcium source is selected from the group consisting of calcium carbonate, calcium oxide, calcium hydroxide, calcium chloride, calcium phosphate and mixtures thereof and wherein the iron source is selected from the group consisting of iron (II) sulfate and iron (II) sugar complexes and mixtures thereof.

8. A product according to claim 6 wherein the potentiating agent is selected from the group consisting of citric acid, malic acid, tartaric acid, ascorbic acid and water-soluble salts and mixtures thereof.

9. A product according to claim 6 wherein the mineral supplement composition and the first hardboiled candy composition are in a weight ratio of from about 5:1 to about 1:5.

10. A product according to claim 9 comprising from about 12% to about 60% by weight of the mineral supplement composition, from about 12% to about 60% of first hardboiled sugar-free candy composition and from about 5% to about 40% of second hardboiled candy composition.

11. A product according to claim 1 wherein the mineral supplement composition additionally comprises an agent selected from the group consisting of vitamins, plasticizers, fillers, flavoring agents, coloring agents, sweetening agents and mixtures thereof.

12. A process for making a candy product according to claim 1 comprising the steps of forming a rope of the first hardboiled sugar-free candy composition and having a centre-filling of the mineral supplement composition, the temperature of the rope being no more than about 65° C. in case of sugar-free compositions and no more than about 90° C. in case of sugar-based compositions, accumulating the rope and drawing the accumulated rope through compacting means to form a skein of centre-filled ropes, folding or repeatedly folding the skein of centre-filled ropes to form a laminated matrix, optionally enveloping the laminated matrix within a layer of the second hardboiled candy composition, and forming the laminated and optionally enveloped matrix into the final candy product.

* * * * *